A. J. HARTLEY.
SUPPORT AND GEARING FOR SWINGING CONVEYERS.
APPLICATION FILED FEB. 3, 1919.
1,327,469.
Patented Jan. 6, 1920.
3 SHEETS—SHEET 1.
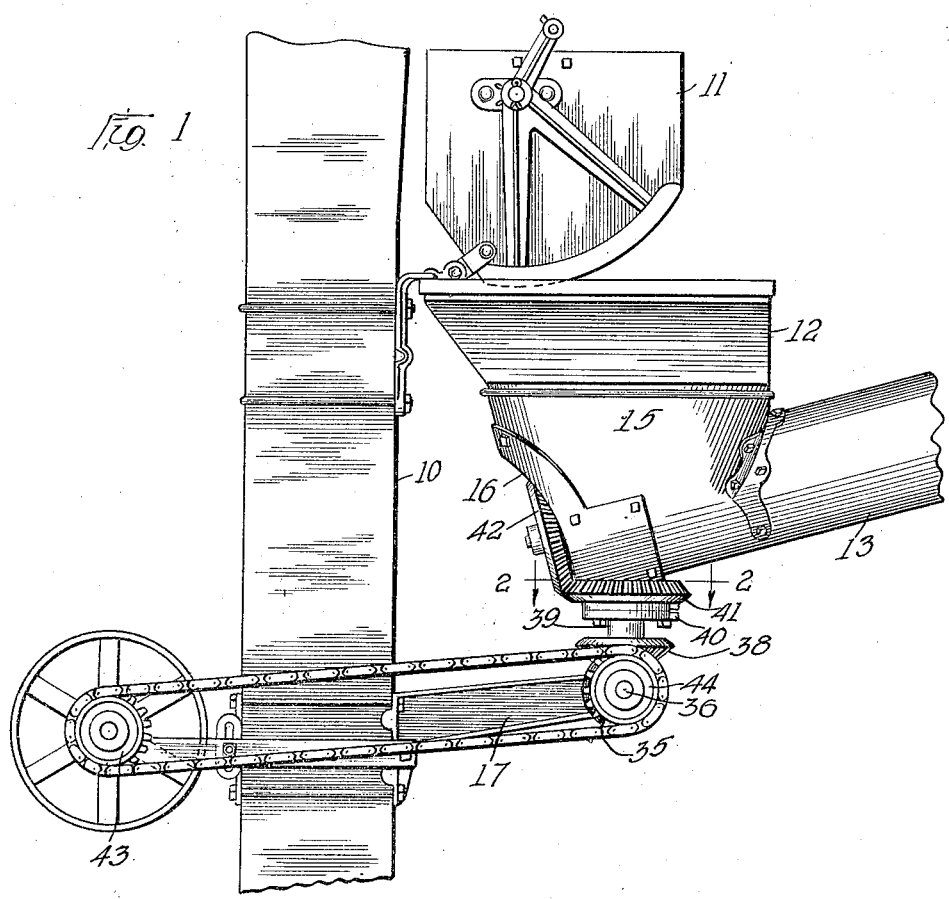
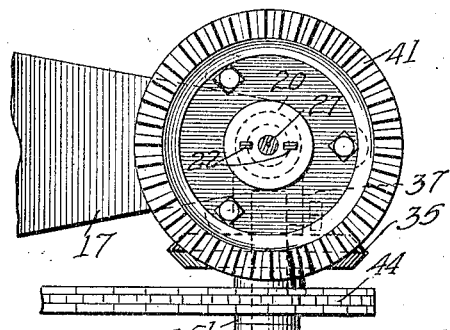

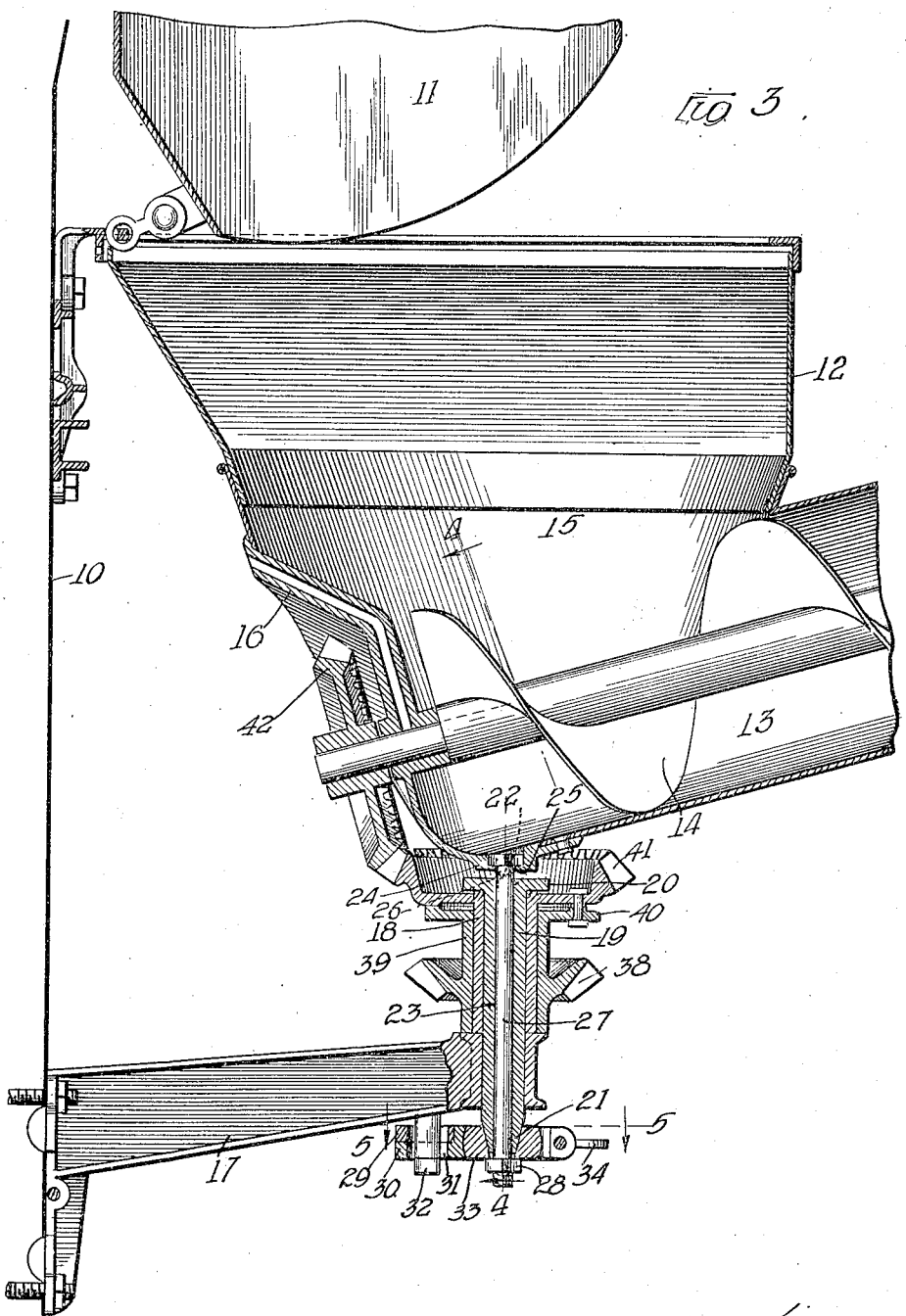

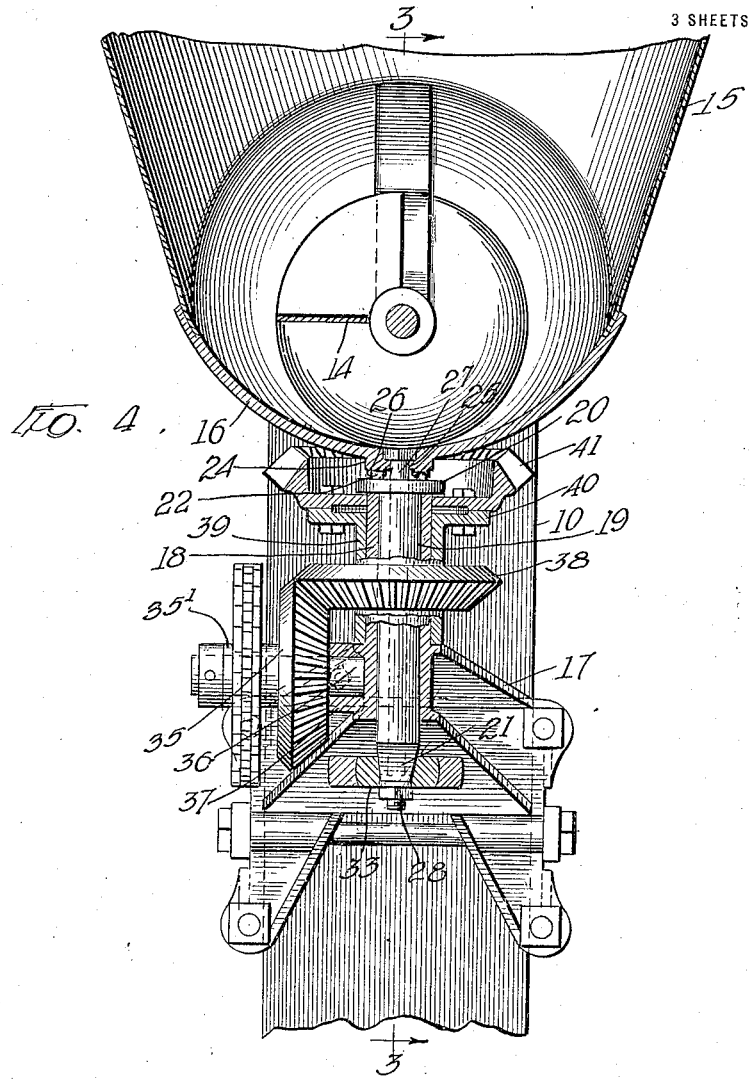
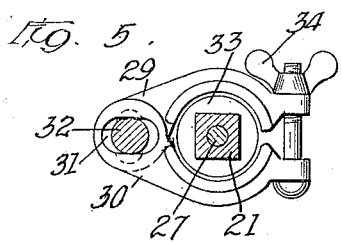

UNITED STATES PATENT OFFICE.

ARTHUR J. HARTLEY, OF PEORIA, ILLINOIS.

SUPPORT AND GEARING FOR SWINGING CONVEYERS.

1,327,469.    Specification of Letters Patent.    Patented Jan. 6, 1920.

Application filed February 3, 1919. Serial No. 274,763.

*To all whom it may concern:*

Be it known that I, ARTHUR J. HARTLEY, citizen of the United States, residing at Peoria, in the county of Peoria and State of Illinois, have invented certain new and useful Improvements in Supports and Gearing for Swinging Conveyers, of which the following is a specification.

My invention relates to swinging conveyers.

My invention is designed for special application to grain weigher appliances for threshing machines, as exemplified by companion application filed herewith, said application bearing filing date February 3, 1919, and Serial No. 274,762.

The invention has special reference to details of construction relative to supported conveyer member, and supporting means therefor, and a related brake element; also to details relative to gear members, and their relative association.

Referring to the drawings—

Figure 1 is a view, in elevation, illustrating the manner of associating a conveyer element with grain weigher members;

Fig. 2 is a cross-sectional view on the line 2—2 of Fig. 1;

Fig. 3 is a vertical, sectional view through the vertical center of certain of the devices illustrated in Fig. 1 taken on line 3—3 of Fig. 4;

Fig. 4 is a vertical sectional view on the line 4—4 of Fig. 3.

Fig. 5 is a cross sectional view on the line 5—5 of Fig. 3.

My invention, as herein disclosed, was developed as a result of practical experience and necessities growing out of an application of conveyer elements in association with grain weighers, and is an advance over previously known practices, because of increased efficiency and durability of parts serving as connecting means for support and driving between a supporting element and a cross-conveyer.

Referring to the drawings, 10 is an elevator stand; 11 is a weigher bucket; 12 is a stationary hopper attached to the elevator stand 10.

Referring particularly to cross-conveyer elements, 13 is a conveyer member, which, in practice, may contain conveying elements, as for instance, the auger member 14 herein, and is provided at its rear or receiving end with a hopper element as 15, and a reinforcing or stiffening cast member 16 may be provided as a closure member for its rear end.

A supporting member 17 is provided, attached to the elevator stand 10, as shown, and having sufficient reach to properly space the conveyer therefrom, and is provided with an upwardly extended sleeve member 18, which serves as the means for support and centering of the connecting and supporting elements herein for the elevator, and, similarly, for gear parts that are actively connected with the operation of the conveying element of the conveyer.

Referring now particularly to the manner of supporting the conveyer, and to the detail parts employed therefor, 19 is a sleeve turnably supported within supporting sleeve member 18, and is provided with a head member 20 adapted to rest upon the upper edge of sleeve member 18, and to turn thereon, and is tapered at its lower end as at 21, for the purpose hereinafter noted.

Upon head 20, there are formed V-shaped lugs 22, spaced at either side of the central opening 23, through sleeve member 19. At about a vertical center line drawn through hopper member 15 of the conveyer, a boss or inset extension 24 is formed on cast member 16, and is provided with a hole or entrance opening 25 at its center, in line with the opening 23 in sleeve member 19, and on its bottom face with V-shaped lugs as 26, which are adapted in practice to be carried respectively between the sets of V-shaped lugs 22 on head member 20 of sleeve 19. This manner of support affords a connection between the conveyer and its support that will permit tilting of the latter to effect proper centering to facilitate pivot action, and also provides widely spaced interengaging bearings between the elevator and support that are of advantage in the matter of turning the conveyer relative to its support.

27 is a bolt, its head being seated in boss member 24, and extending therethrough, and also through sleeve member 19 and is threaded at its lower end and adapted to carry a nut member as 28.

In practice, the conveyer must be moved almost constantly. I have found, in practice, that to best adapt the conveyer for use in loading wagons at the sides of a threshing-machine, it was necessary to provide a brake of a nature that would serve, more or less, to definitely fix the conveyer in position after manual force had been applied to position it. In practice, I have further found that a friction brake would best serve the purpose, because if the friction brake element were properly applied, manual force could be exerted upon the conveyer reach and push it to a given point where it would stop and be held the instant manual force ceased.

To this end, therefore, I have applied the brake mechanism herein disclosed.

Referring to the brake mechanism, 29—30 are brake band sections having coincident openings, or holes, 31, therein, adapted to center about pin 32 fixed to and depending from reach or arm member 17. The connection is a sufficiently loose one to permit relative longitudinal shifting of the brake band members to accommodate variations in the size or brake face conformation of a companion brake member. Preferably, I form the brake faces, or brake members 29—30 on curved lines.

33 is a brake member provided, preferably, with a brake face formed on general curved lines, said brake member being properly formed to engage the tapered face of part 21, of sleeve 19. The several parts, including the conveyer sleeve 19 and brake member 33, are held together by and through the application of nut 28 to bolt or pin 27.

Brake band members 29—30 are each provided with perforated lug members at their normal free ends, adapted to carry and coöperate with a thumb nut 34, the latter adapted to regulate tension of said brake members upon brake member 33. The brake members being first properly related to permit swinging of the conveyer upon the application of manual force, will be held by said brake member in any desired position during service of the conveyer in loading a wagon.

One of the material features of my invention is the manner of relating gear drive elements to the centering support, comprising a sleeve 18, the form of such gear parts, and the manner of relating said gears.

Referring particularly to the gear parts, 35 is a bevel gear, having hub extension 35' supported upon stub or pin 36, the latter being supported in sleeve extension 37 from sleeve member 18. 38 is a bevel gear, drivable from gear 35, and is provided with sleeve formed, hub member 39, and is turnably supported in connection with sleeve 18, and is flanged at its upper end as at 40. 41 is a bevel gear wheel centered about sleeve member 18, and suitably bolted or secured to flanged member 40 on hub extension 39 of gear wheel 38. A conveyer-driving gear 42 is suitably supported to be driven in connection with said auger, and is designed to be driven from the gear train hereinbefore 35, 38 and 41. The complete train of gears leading to the conveyer element of the conveyer may be driven from any suitable source of power, but as herein shown, is driven from a driving sprocket 43, the same being a driven element of a threshing machine (not shown), to sprocket wheel 44, the latter being suitably fixed on hub extension 35' of gear 35.

It will be noted that the invention, as applied, provides for a support for a conveyer, including an extended pivot element; a relating of the conveyer the pivot element in the manner to permit relative adjustment without separation of parts, and also the connection, although loose and readily separable, which provides effectively for such relative engagement that movement of the conveyer will cause the pivoted support to be turned therewith; a brake element associated with the pivoted support for the conveyer, whereby the latter will be turned under the tension of the former. Also, it will be noted that the related gear train associated for driving the conveyer element in the conveyer is so related to the support and the pivoted member which supports the conveyer, that they are respectively turnable about the same center, without interference relatively.

The relative arrangement of the several parts named are such that they perform their several required functions, and at the same time, because of such manner of relating, this part of the complete structure is rendered very compact.

What I claim is:

1. In a support and gearing for swinging conveyers, in combination, an extended, stationary, vertically disposed sleeve member, a turnable sleeve member supported therein, fashioned with a flanged member at its upper end provided with lugs thereon, a brake member attached to the turnable sleeve, a suitable brake band related thereto to permit limited brake action thereon, a conveyer member provided with lugs coöperating with the lugs on the turnable sleeve, and a pin connecting the conveyer member, the turnable sleeve, and the brake member, substantially as shown.

2. In a support and gearing for swinging conveyers, in combination, a suitably supported arm or reach provided with a vertically disposed sleeve member, a turnable sleeve member therein, flanged at its upper end, and provided with lugs on the upper face therefor, a brake member suitably fixed thereon, suitably related coöperating brake members therefor, comprising relatively adjustable parts adapted to apply limited brake action to said brake member on the turnable sleeve member, a conveyer member adapted to receive and convey grain thereat its receiving end, having an inseat or boss thereon, provided with depending lugs adapted to coöperate with lugs on the head of the turnable sleeve member, and a pin adapted to connect the conveyer member, turnable sleeve member and the brake member.

3. In a support and gearing for swinging conveyers, in combination, a suitably supported arm or reach having a vertically disposed sleeve connected with its outer end, a turnable sleeve supported thereon and turnable therein, having a flange at its upper end, provided with lugs on its upper face, and formed with a gradually tapered lower end, a brake member having a central opening conforming to the shape of the lower end of the sleeve member and adapted to be applied thereto, suitably supported and relatively adjustable members adapted to apply brake action to the brake member on the turnable sleeve, means for applying such brake action within proper limits, a conveyer member, including a cast closure member, for the receiving end thereof, formed with an inseat on a line with the longitudinal center of said elevator member, and with lug members for coöperation with lug members on the head portion of the turnable sleeve member, and a pin adapted to connect the conveyer member, the turnable sleeve member and the brake member, in a manner that will cause said connected members to be turned together.

4. In a support and gearing for swinging conveyers, in combination, a suitably supported arm or reach provided at its upper end with a sleeve member, a turnable sleeve member therein, a conveyer member having a conveying element therein, and supported upon said turnable sleeve member, a brake member suitably applied and related to the turnable sleeve member to apply limited brake action thereto, gear members intermediate of an associated train, serving to actuate the conveyer element in the conveyer member, including a gear, sleeved upon and turnable about said turnable sleeve member, and an associated gear member attached thereto, substantially as described.

5. In a support and gearing for swinging conveyers, in combination, a conveyer having an associated gear driven element, a bracket provided with a vertically disposed sleeve member, an elongated turnable sleeve member supported therein, provided with a flanged portion adapted for supporting the conveyer member in a relation that the latter may be turned therewith, a brake member associated with the sleeve member in a relation, normally, to act as a stop against the turning of said sleeve member, and driving gear members for the gear driven element of the conveyer centered about the axis of the sleeve support therefor, and associated with the gear element of said conveyer, in a relation that the latter may be swung about its pivoted support into different positions without interrupting the driving action of said connected gears.

6. In a support and gearing for swinging conveyers, in combination, a conveyer, an auger therein, a gear thereon, a supporting sleeve, an elongated turnable sleeve member supported therein and thereon adapted for supporting the conveyer in a relation that the latter may be turned therewith, a brake member related to the sleeve member in a manner to apply limited friction thereto, and a driving gear member centered about the axis of the sleeve and supported upon the elongated sleeve and related to the gear on the auger shaft in a manner to permit the conveyer to be turned about its axis of support, without interrupting the driving action of the gear members, and means for driving said gear.

7. In a support and gearing for swinging conveyers, in combination, a swinging conveyer element, a bracket member including an elongated sleeve, a turnable sleeve member therein adapted to support the conveyer at its upper end, a brake member applied to the lower end of the sleeve member, a member for connecting the conveyer, sleeve and brake members, coöperating gear members centered about the axis of the sleeve member, and supported by the elongated sleeve, comprising members of a gear train adapted to drive the conveyer element without interruption as the conveyer is swung about its pivotal support.

8. In a device of the class described, in combination, a conveyer housing, an auger therein, a suitably supported tubular member, a supporting member for the conveyer housing pivotally supported thereon, gearing for driving the auger comprising a driven gear wheel sleeved upon the tubular member, a supplemental gear wheel upon the same driving center connected therewith and a gear wheel fixed to the auger shaft.

9. In a device of the class described, in combination, a conveyer housing, an auger therein, a suitably supported vertical sleeve, a supporting member for the conveyer housing pivotally supported in connection with the sleeve, means for connecting the conveyer housing and its supporting member and means for driving the auger including a driven gear wheel sleeved upon the said sleeve member, a gear wheel upon the same driving center as the driven gear and connected therewith and a gear wheel upon the auger shaft meshing with the last named gear wheel.

In testimony whereof I have affixed my signature.

ARTHUR J. HARTLEY.